United States Patent [19]

Ono

[11] Patent Number: 4,576,985
[45] Date of Patent: Mar. 18, 1986

[54] HOT-MELT ADHESIVE

[75] Inventor: Yasuichi Ono, Miyagi, Japan

[73] Assignee: Alps Electric Co., Ltd., Tokyo, Japan

[21] Appl. No.: 638,869

[22] Filed: Aug. 8, 1984

[30] Foreign Application Priority Data

Aug. 8, 1983 [JP] Japan .................. 58-143797

[51] Int. Cl.$^4$ .................. C08K 3/10; C08L 15/02; C08L 33/10; C08L 87/00
[52] U.S. Cl. .................. 524/407; 524/335; 524/384; 524/406; 524/413; 524/430; 524/435; 524/474; 428/429
[58] Field of Search ............ 524/196, 406, 423, 435, 524/265, 413, 430, 335, 384, 407, 474; 428/429

[56] References Cited

U.S. PATENT DOCUMENTS

| | | | |
|---|---|---|---|
| 3,395,069 | 7/1966 | Plueddemann | 428/429 |
| 3,413,186 | 11/1968 | Marzocchi | 428/429 |
| 3,484,333 | 12/1969 | Vanderbilt | 524/265 |
| 3,547,766 | 12/1970 | Cho | 428/429 |
| 3,766,131 | 10/1973 | Arkles | 524/265 |
| 4,409,266 | 10/1983 | Wieczorrek et al. | 428/429 |
| 4,457,970 | 7/1984 | Das et al. | 428/429 |

*Primary Examiner*—Allan M. Lieberman
*Attorney, Agent, or Firm*—Guy W. Shoup

[57] ABSTRACT

A hot-melt adhesive which is particularly suitable for an adherend surface carrying silanol groups. The adhesive contains a compound capable of combining chemically with oxygen in the silanol groups to render the adherend surface hydrophobic.

9 Claims, 10 Drawing Figures

HOT-MELT ADHESIVE

BACKGROUND OF THE INVENTION

1. Field of the Invention

This invention relates to a hot-melt adhesive. More particularly, it is concerned with a hot-melt adhesive having an excellent adhesive strength for the surface of an adherend containing silicon dioxide, such as glass or ceramics.

2. Description of the Prior Art

Many hot-melt adhesives are known, but they are all unsatisfactory in adhesive strength when they are used for bonding, for example, glass, ceramics, a high molecular substance or a metal to a glass surface. Their adhesive strength is so low that they easily peel off the glass surface, especially if they are used in an environment having a high degree of humidity. This is apparently due to the hydrophilic silanol groups (Si—OH) existing on the surface of glass which adsorb water molecules ($H_2O$) in a highly humid environment resulting in the association of those water molecules to form a water layer 2 on the surface of glass 1, as shown in FIG. 1. The water layer 2 formed in the interface between the glass 1 and a hot-melt adhesive 3 accelerates the peeling of the adhesive 3 from the glass 1.

SUMMARY OF THE INVENTION

It is an object of this invention to provide a hot-melt adhesive which can maintain a high adhesive strength even in a highly humid environment.

This object is attained by a hot-melt adhesive containing a compound which combines chemically with oxygen in silanol groups on an adherend surface, such as of glass, and thereby make the adherend surface hydrophobic.

DETAILED DESCRIPTION OF THE INVENTION

The hot-melt adhesive of this invention comprises a thermoplastic high molecular substance, an organic solvent and a compound imparting hydrophobicity. It may also contain a tackifier, a filler and an electrically conductive fine powder, if required. A paint composed of these constituents can be applied by, for example, screen printing to an adherend surface formed from, for example, a synthetic resin film, or a glass, synthetic resin or metal sheet. If is is dried, it forms a thin hot-melt adhesive layer which no longer contains any organic solvent.

The adhesive preferably contains about 5 to about 65% by weight of a thermoplastic high molecular substance having a high degree of moisture resistance, for example, an ethylene-vinyl acetate copolymer, a polyester, polyamide or polymethyl methacrylate resin or chloroprene rubber, or a mixture thereof.

The adhesive preferably contains about 25 to about 65% by weight of a low-boiling organic solvent which vaporizes almost completely if heated to a temperature of, say, 120° C. to 200° C., for example, toluene, isophorone, benzene alcohol, carbitol, carbitol acetate, decalin or acetophenone.

The adhesive preferably contains about 0.1 to about 25% by weight of a hydrophobicity-imparting compound, for example, a metal salt such as nickel chloride or ammonium molybdate, a metal oxide such as chromium oxide, a silane coupling agent such as methylchlorosilane, phenyltrichlorosilane, γ-aminopropyltriethoxysilane or trichlorosilane, a titanium coupling agent, an isocyanate compound or a Lewis base.

Figure 2A:
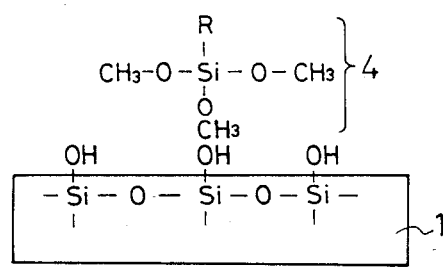
FIG. 2(a) is a view illustrating a reaction taking place between silanol groups on a glass surface and a silane coupling agent in an adhesive.
Figure 2B:
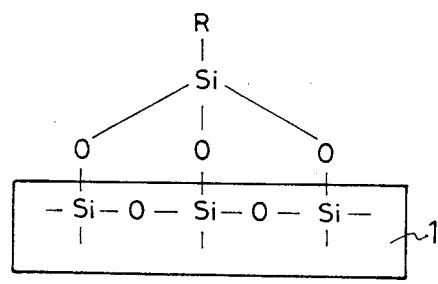
FIG. 2(b) is a view illustrating the result of the reaction shown in FIG. 2(a)
Figure 3A:
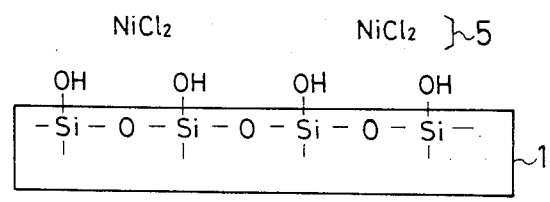
FIG. 3(a) is a view illustrating a reaction taking place between silanol groups on a glass surface and nickel chloride in an adhesive.
Figure 3B:
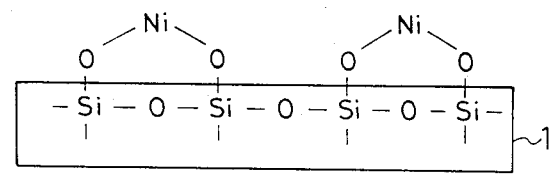
FIG. 3(b) is a view illustrating the result of the reaction shown in FIG. 3(a)
Figure 4:
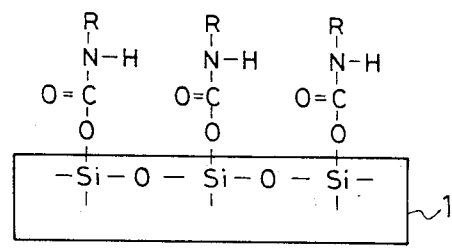
FIG. 4 is a view illustrating the result of a reaction between silanol groups on a glass surface and an isocyanate compound in an adhesive.
Figure 5:
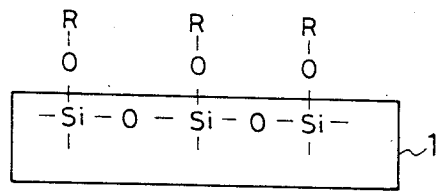
FIG. 5 is a view illustrating the result of a reaction between terminal OH groups in polyester and silanol groups in the presence of a Lewis base.

FIGS. 2(a) and 2(b) show the reaction which will take place between silanol groups (Si—OH) on the surface of glass 1 and a silane coupling agent 4 in an adhesive, and the result thereof, respectively. FIGS. 3(a) and 3(b) show the reaction which will to take place between silanol groups (Si—OH) on the surface of glass 1 and nickel chloride 5 in an adhesive, and the result thereof, respectively. FIG. 4 shows the result of a reaction which has taken place between silanol groups on the surface of glass 1 and an isocyanate compound in an adhesive. FIG. 5 illustrates the use of an adhesive containing a Lewis base as a hydrophobicity-imparting compound, and shows the result of a reaction which has taken place between terminal OH groups in polyester and silanol groups.

Figure 1:
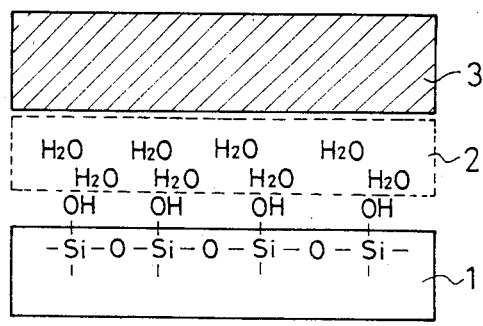
FIG. 1 is a view illustrating the formation of a water layer between glass and a conventional adhesive.

The hot-melt adhesive is brought into intimate contact with the surface of glass 1 under heat. The hydrophobicity-imparting compound which it contains forms a strong chemical bond with oxygen in the silanol groups on the glass surface, whether it may be a silane coupling agent, nickel chloride, an isocyanate compound or a Lewis base, as shown in FIGS. 2(b), 3(b), 4 and 5. As a result, the surface of glass 1 becomes hydrophobic. Therefore, no water layer as shown at 2 between the glass 1 and the adhesive 3 in FIG. 1 is formed even in a highly humid environment.

The adhesive of this invention may also contain a tackifier. If it contains a tackifier, it preferably contains up to about 20% by weight of, for example, a DOP plasticizer, or an ester, terpene, aliphatic or phenolic resin.

The adhesive may also contain up to about 25% by weight of a filler, such as titanium or silicon oxide. An electrically conductive hot-melt adhesive is obtained if an electrically conductive fine powder is added thereto. In any such event, the adhesive preferably contains about 30 to about 60% by weight of a fine powder of carbon in the form of graphite or carbon black, or a metal such as silver.

The invention will now be described more specifically with reference to a number of examples thereof.

EXAMPLE 1

Two hundred parts by weight of chloroprene rubber (Vinylol 2200 of Showa Kobunshi), 100 parts by weight of a polyester resin (7662 of Bostic Japan Ltd.), 300 parts by weight of isophorone and four parts by weight of a silane coupling agent (X-12-413 of Shinetsu Kagaku) were mixed in an attritor for four hours to prepare a paint. The paint was applied by screen printing to an area measuring 40 mm by 10 mm on a 50 mm square polyester film by using a 200-mesh stainless steel mask. The paint was, then, dried at 120° C. for five minutes to form a hot-melt adhesive layer having a thickness of about 20 μm. Then, the polyester film was applied to a glass slide measuring 25 mm by 76 mm and having a thickness of 1.2 mm so that the adhesive layer might contact the glass slide. The assembly was heated at a temperature of 180° C. and a pressure of 15 kg/cm$^2$ for eight seconds, whereby the polyester film was bonded to the glass sheet.

Figure 6:
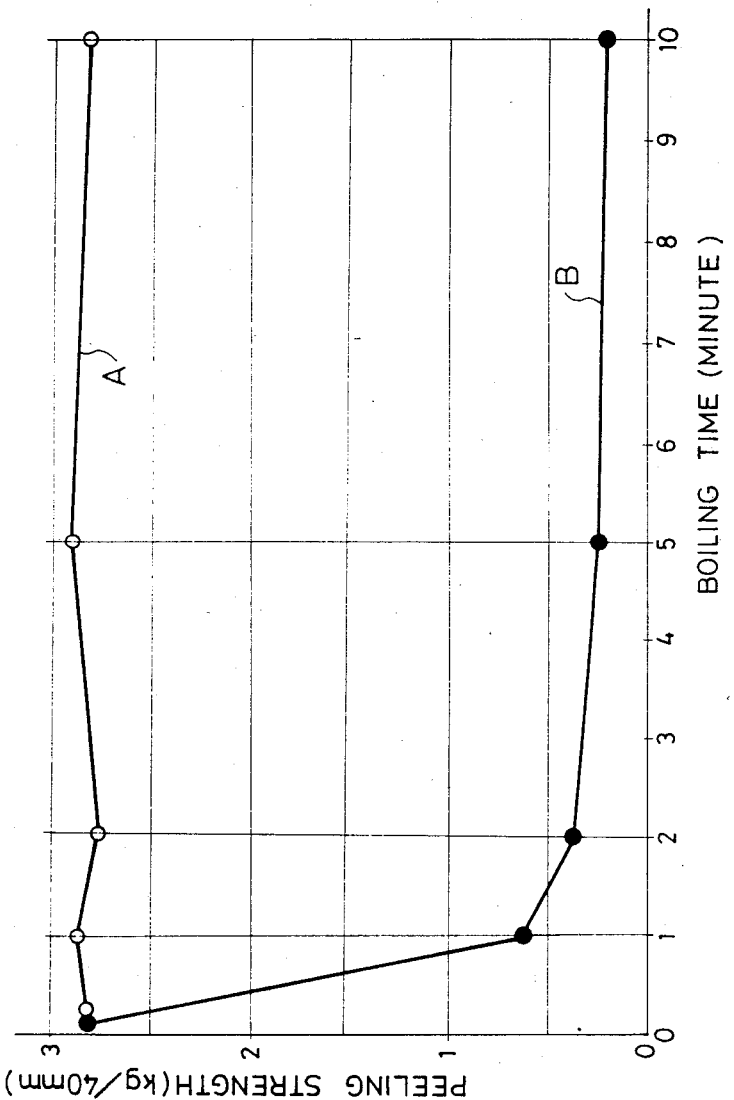
FIG. 6 is a graph comparing an adhesive of this invention and a conventional adhesive in peeling strength.
Figure 7:
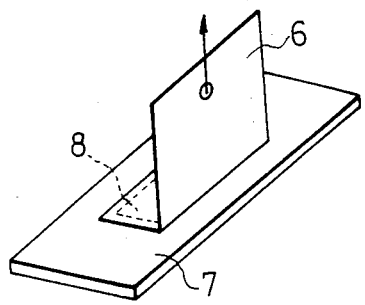
FIG. 7 is a perspective view illustrating a peeling strength test.

This adhesive showed a peeling strength in relation to boiling time as represented by a curve A in FIG. 6. For comparison purposes, FIG. 6 also includes a curve B showing the peeling strength of a conventional hot-melt adhesive not containing any silane coupling agent, but which was otherwise equal in composition to the adhesive of this invention. The peeling strength of each of these adhesives was tested immediately after the polyester film had been bonded to the glass sheet, and also after the bonded assembly had been boiled for one minute, two minutes, five minutes and 10 minutes, respectively. Each test was conducted after water had been carefully removed from the bonded assembly, and after it had been left in an environment having an ordinary ambient temperature and an ordinary ambient humidity for 15 minutes. The polyester film 6 had an unbonded portion and a portion carrying the adhesive layer 8 bonded to the glass sheet 7, as shown in FIG. 7. The unbonded portion of the polyester film 6 was raised at right angles to the glass sheet 7 as shown in FIG. 7, and pulled up by a spring balance in the direction of an arrow.

As is obvious from FIG. 6, the peeling strength of the conventional adhesive showed a reduction to nearly one-sixth when it had been boiled for one minute, and its reduction continued with an increase in boiling time. On the other hand, the adhesive of this invention did not show any appreciable change in peeling strength with the lapse of time, but always maintained a high degree of peeling strength.

EXAMPLE 2

A paint was prepared by mixing 500 parts by weight of chloroprene rubber (Vinylol 2202 of Showa Kobunshi), 250 parts by weight of a polyester resin (7662 of Bostic Japan Ltd.), 400 parts by weight of isophorone, 12 parts by weight of nickel chloride, 15 parts by weight of DOP as a plasticizer and 12 parts by weight of titanium oxide as a filler. The paint was applied by screen printing to an area measuring 40 mm by 10 mm on a 50 mm square polyester film by using a 200-mesh stainless steel mask. The paint was, then, dried at 120° C. for five minutes to form a hot-melt adhesive layer having a thickness of about 20 μm. The polyester film was, then, applied to a glass slide measuring 25 mm by 76 mm and having a thickness of 1.2 mm so that the adhesive layer might contact the glass sheet. The assembly was heated at a temperature of 170° C. and a pressure of 15 kg/cm$^2$ for six seconds, whereby the polyester film was bonded to the glass sheet.

Figure 8:
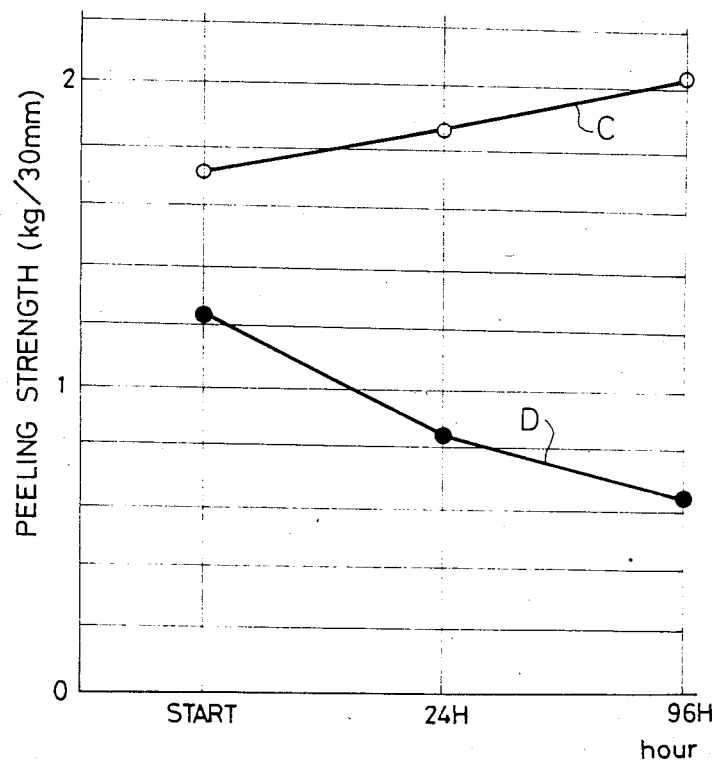
FIG. 8 is another graph comparing an adhesive of this invention and a conventional adhesive in peeling strength.

This adhesive showed a peeling strength in relation to time as represented by a curve C in FIG. 8. For comparison purposes, FIG. 8 also includes a curve D showing the peeling strength of a conventional hot-melt adhesive not containing any nickel chloride, but which was otherwise equal in composition to the adhesive of this invention. The peeling strength of each of these adhesives was tested at a temperature of 65° C. and a humidity of 95%. As is obvious from FIG. 8, the conventional adhesive showed a gradual reduction in peeling strength with the lapse of time, but the adhesive of this invention always maintained a high level of peeling strength in a hot and humid environment and even showed a gradual increase in peeling strength. The excellent moisture resistance of the adhesive of this invention was, thus, ascertained.

What is claimed is:

1. A hot melt adhesive suitable for bonding materials to an adherend surface which is characterized by the presence of hydrophilic silanol groups, said adhesive comprising from 5% to 65% by weight of a thermoplastic resin, from 25% to 65% by weight of a low boiling solvent substantially all of which will evaporate when the adhesive is held at a temperature of from 120° C. to 200° C. for a sufficient period of time, and from 0.1% to 25% by weight of a metal salt which will react with said silanols to render said adherend surface hydrophilic.

2. An adhesive as set forth in claim 1, wherein said salt is nickel chloride.

3. An adhesive as set forth in claim 1, wherein said salt is ammonium molybdate.

4. A hot-melt adhesive as set forth in claim 1 wherein said resin is an ethylene-vinyl acetate copolymer.

5. A hot-melt adhesive as set forth in claim 1, wherein said resin is a polyester resin.

6. A hot-melt adhesive as set forth in claim 1, wherein said resin is a polyamide resin.

7. A hot-melt adhesive as set forth in claim 1, wherein said resin is polymethyl methacrylate resin.

8. A hot-melt adhesive as set forth in claim 1 wherein said resin is chloroprene rubber.

9. A hot-melt adhesive as set forth in claim 1 wherein said resin is a mixture of an ethylene-vinly acetate copolymer, a polyester, polyamide or polymethyl methacrylate resin or chloroprene rubber.

* * * * *